United States Patent
Shin et al.

(10) Patent No.: US 10,860,128 B2
(45) Date of Patent: Dec. 8, 2020

(54) TOUCH DISPLAY PANEL AND TOUCH DISPLAY DEVICE

(71) Applicant: LG Display Co., Ltd., Seoul (KR)

(72) Inventors: SeungMok Shin, Daegu (KR); CheolSe Kim, Daegu (KR); JuHan Kim, Paju-si (KR); HoonBae Kim, Seoul (KR); HyunHo Park, Gyeongsangbuk-do (KR); Jinseong Kim, Paju-si (KR); YongChan Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/448,834

(22) Filed: Jun. 21, 2019

(65) Prior Publication Data
US 2020/0004365 A1    Jan. 2, 2020

(30) Foreign Application Priority Data

Jun. 29, 2018 (KR) .................. 10-2018-0075982

(51) Int. Cl.
*G06F 3/041*      (2006.01)
*G06F 3/044*      (2006.01)
*G09G 3/20*      (2006.01)

(52) U.S. Cl.
CPC ............ *G06F 3/0412* (2013.01); *G06F 3/044* (2013.01); *G06F 3/0418* (2013.01); *G06F 3/04166* (2019.05); *G09G 3/2092* (2013.01); *G06F 2203/04107* (2013.01)

(58) Field of Classification Search
CPC ...... G06F 3/0412; G06F 3/044; G06F 3/0416; G06F 3/041; G06F 3/0488; G06F 2203/04107
See application file for complete search history.

(56) References Cited

U.S. PATENT DOCUMENTS

| | | | |
|---|---|---|---|
| 9,250,735 B2 * | 2/2016 | Kim ...................... | G06F 3/0412 |
| 2016/0253023 A1 * | 9/2016 | Aoyama ................. | G06F 3/044 |
| | | | 345/174 |
| 2016/0291746 A1 * | 10/2016 | Kim ...................... | G06F 3/0416 |
| 2018/0052349 A1 | 2/2018 | Chen | |
| 2018/0107315 A1 * | 4/2018 | Lee ....................... | G09G 3/3688 |
| 2018/0321788 A1 * | 11/2018 | Kimura ............. | G02F 1/136213 |

OTHER PUBLICATIONS

Combined Search and Examination Report, UK Patent Application No. GB1909254.3, dated Nov. 13, 2019, 5 pages.

* cited by examiner

*Primary Examiner* — Sanjiv D. Patel

(74) *Attorney, Agent, or Firm* — Fenwick & West LLP

(57) ABSTRACT

A touch display panel and device. A common electrode is provided between a display driving signal line and a touch line. The common electrode functions as a shielding pattern that prevents display noise of a touch sensing signal without increasing the number of masks used to form the touch display device. A touch load reducing layer is disposed in a region between the touch line and the common electrode, except for a region in which the common electrode and pixel electrodes overlap. This reduces the load of the touch line and improves touch sensing performance without having an adverse effect on display driving.

21 Claims, 15 Drawing Sheets

TOUCH DISPLAY PANEL AND TOUCH DISPLAY DEVICE

CROSS REFERENCE TO RELATED APPLICATION

This application claims priority to Republic of Korea Patent Application No. 10-2018-0075982, filed on Jun. 29, 2018, which is hereby incorporated by reference in its entirety.

BACKGROUND

Field

Embodiments of the present disclosure relate to a touch display panel and a touch display device.

Description of Related Art

In response to the development of the information society, demand for various types of display devices for displaying images is increasing. In this regard, a range of display devices, such as liquid crystal display (LCD) devices and organic light-emitting diode (OLED) display devices, have recently come into widespread use.

Such a display device has a touch-based user interface to sense a touch, input to a display panel using a pointer, such as a finger of a user or a pen, and perform input processing based on the sensed touch in order to provide more variety of functions.

For example, a touch-sensing display device may include a plurality of touch electrodes disposed on or embedded in a display panel to detect a user's touch, input to the display panel, touch coordinates, or the like, by driving the touch electrodes.

Since the touch-sensing display device provides both an image display function and a touch sensing function using the display panel, the display driving may be influenced by touch sensing or the performance of touch sensing may be degraded by display driving, which is problematic.

BRIEF SUMMARY

Various aspects of the present disclosure provide a touch display panel and device able to perform touch sensing independently of display driving.

Also provided are a touch display panel and device able to prevent noise in touch sensing signals, which would otherwise be induced by electrodes or signal lines to which voltages or signals are applied due to display driving.

Also provided are a touch display panel and device having a structure able to prevent noise in touch sensing signals while minimizing an increase in the number of masks used in the touch display panel and device.

Also provided are a touch display panel and device able to prevent display driving performance from being degraded by a touch-sensing structure while reducing the load of touch lines.

According to an aspect of the present disclosure, a touch display device may include: a plurality of data lines; a plurality of touch lines including a touch line that overlaps a data line from the plurality of data lines; a plurality of common electrodes located between the plurality of data lines and the plurality of touch lines, the plurality of common electrodes including a common electrode between the touch line and the data line such that the common electrode overlaps both the touch line and the data line; a plurality of pixel electrodes including a pixel electrode that forms an electric field with the common electrode; and a touch load reducing layer between the touch line and the common electrode; wherein the touch line overlaps the touch load reducing layer and a width of the touch load reducing layer is wider than a widest width of the touch line.

According to an aspect of the present disclosure, a touch display panel may include: a plurality of data lines; a plurality of touch lines including a touch line that overlaps a data line from the plurality of data lines; a plurality of common electrodes located between the plurality of data lines and the plurality of touch lines, the plurality of common electrodes including a common electrode between the touch line and the data line such that a portion of the common electrode overlaps both the touch line and the data line, the portion of the common electrode shielding the touch line from the data line; a plurality of pixel electrodes including a pixel electrode that forms an electric field with the common electrode; and a touch load reducing layer between the touch line and the common electrode.

In the display panel and device according to exemplary embodiments, it is possible to simultaneously perform display driving and touch sensing by modulating at least a portion of display driving signals, based on a touch driving signal applied to the touch electrodes.

In the display panel and device according to exemplary embodiments, it is possible to reduce display noise of touch sensing signals by disposing the shielding pattern between the touch line and the display driving signal line disposed to overlap the touch line.

In the display panel and device according to exemplary embodiments, it is possible to minimize an increase in the number of masks and improve touch sensing performance by disposing the shielding pattern between the display driving signal line and the touch line using the common electrode (or touch electrode).

In the display panel and device according to exemplary embodiments, it is possible to reduce the load of the touch line by disposing the touch load reducing layer between the touch line using the common electrode (or touch electrode). In addition, it is possible to prevent display driving performance from being degraded by the touch sensing structure by omitting the touch load reducing layer from the region in which the common electrode and the pixel electrode overlap.

BRIEF DESCRIPTION OF THE DRAWINGS

The above and other objects, features, and advantages of the present disclosure will be more clearly understood from the following detailed description when taken in conjunction with the accompanying drawings, in which.

DETAILED DESCRIPTION

Figure 1:
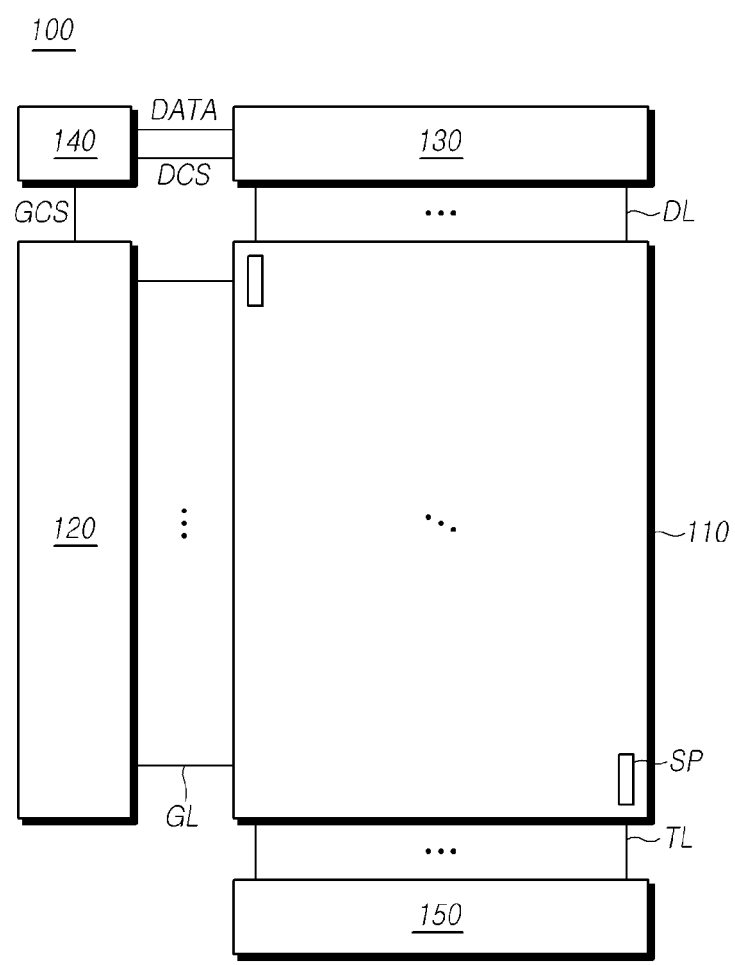
FIG. 1 is a diagram illustrating a schematic configuration of a touch display device according to embodiments of the present disclosure.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element.

FIG. 1 is a diagram illustrating a schematic configuration of a touch display device 100 according to embodiments of the present disclosure.

Referring to FIG. 1, the touch display device 100 according to embodiments of the present disclosure may include a touch display panel 110, a gate driver circuit 120, a data driver circuit 130, and a controller 140. In addition, the touch display device 100 may include a touch driver circuit 150 to sense a touch, input to the touch display panel 110.

A plurality of gate lines GL and a plurality of data lines DL are disposed in the touch display panel 110, and a plurality of subpixels SP are disposed in areas in which the gate lines GL and the data lines DL intersect.

In addition, a plurality of touch electrodes TE (not shown in FIG. 1; see, e.g., FIG. 2) may be disposed or embedded in the touch display panel 110, and a plurality of touch lines TL may be disposed in the touch display panel 110 to electrically connect the touch electrodes TE and the touch driver circuit 150.

First, describing a configuration for display driving in the touch display device 100, the gate driver circuit 120 controls the driving timing of the subpixels SP disposed in the touch display panel 110. In addition, the data driver circuit 130 displays an image by supplying data voltages Vdata, corresponding to image data, to the subpixels SP, so that the subpixels SP represent luminance levels corresponding to grayscales of the image data.

Specifically, the gate driver circuit 120 is controlled by the controller 140, and sequentially outputs a scanning signal to the plurality of gate lines GL disposed in the touch display panel 110 to control the driving timing of the plurality of subpixels SP.

The gate driver circuit 120 may include one or more gate driver integrated circuits (GDICs). The GDICs may be disposed on one side or both sides of the touch display panel 110, depending on the driving system. Alternatively, the gate driver circuit 120 may have a gate-in-panel (GIP) structure embedded in a bezel area of the touch display panel 110.

The data driver circuit 130 receives image data (or input data) from the controller 140, and converts image data into analog data voltages Vdata. Then, the data driver circuit 130 outputs the data voltages Vdata to the data lines DL at points in time at which the scanning signal is applied to the gate lines GL, so that the subpixels SP represent luminance levels corresponding to image data.

The data driver circuit 130 may include one or more source driver integrated circuits (SDICs).

The controller 140 supplies a variety of control signals to the gate driver circuit 120 and the data driver circuit 130 to control the operation of the gate driver circuit 120 and the data driver circuit 130.

The controller 140 controls the gate driver circuit 120 to output the scanning signal at points in time defined by frames. The controller 140 converts image data received from an external source into a data signal format readable by the data driver circuit 130, and outputs the converted image data to the data driver circuit 130.

The controller 140 receives a variety of timing signals, including a vertical synchronization signal Vsync, a horizontal synchronization signal Hsync, an input data enable (DE) signal, and a clock (CLK) signal, in addition to the image data, from an external source (e.g. a host system).

The controller 140 may generate a variety of control signals using the variety of timing signals received from the external source and output the variety of control signals to the gate driver circuit 120 and the data driver circuit 130.

For example, the controller 140 outputs a variety of gate control signals (GCS), including a gate start pulse (GSP), a gate shift clock (GSC), a gate output enable (GOE) signal, and the like, to control the gate driver circuit 120.

Here, the GSP controls the operation start timing of one or more GDICs of the gate circuit 120. The GSC is a clock signal commonly input to the one or more GDICs to control the shift timing of scanning signals. The GOE signal designates timing information of the one or more GDICs.

In addition, the controller 140 outputs a variety of data driving control signals (DCS), including a source start pulse (SSP), a source sampling clock (SSC), a source output enable (SOE) signal, and the like, to control the data driver circuit 130.

Here, the SSP controls the data sampling start timing of one or more SDICs of the data driver circuit 130. The SSC is a clock signal controlling the sampling timing of data in each of the SDICs. The SOE signal controls the output timing of the data driver circuit 130.

The touch display device 100 may further include a power management integrated circuit (PMIC) to supply various forms of voltage or current to the touch display panel 110, the gate driver circuit 120, the data driver circuit 130, the touch driver circuit 150, and the like, or control various forms of voltage or current to be supplied to the same.

The subpixels SP are defined by the gate lines GL and the data lines DL intersecting each other. Liquid crystal or light-emitting diodes (LEDs), e.g. organic light-emitting diodes (OLEDs), may be disposed in the subpixels, depending on the type of the touch display device 100.

For example, in a case in which the touch display device 100 is a liquid crystal display (LCD) device, a light source device, such as a backlight unit, illuminating the touch display panel 110 is included, and liquid crystal is disposed in the subpixels SP of the touch display panel 110. Since the orientations of liquid crystal molecules are adjusted by electric fields generated by the data voltages Vdata applied to the subpixels SP, an image can be displayed by representing luminance levels according to image data.

In addition, the touch display device 100 according to embodiments of the present disclosure may detect a user's touch, input to the touch display panel 110, using the touch electrodes TE provided in the touch display panel 110 and the touch driver circuit 150.

Figure 2:
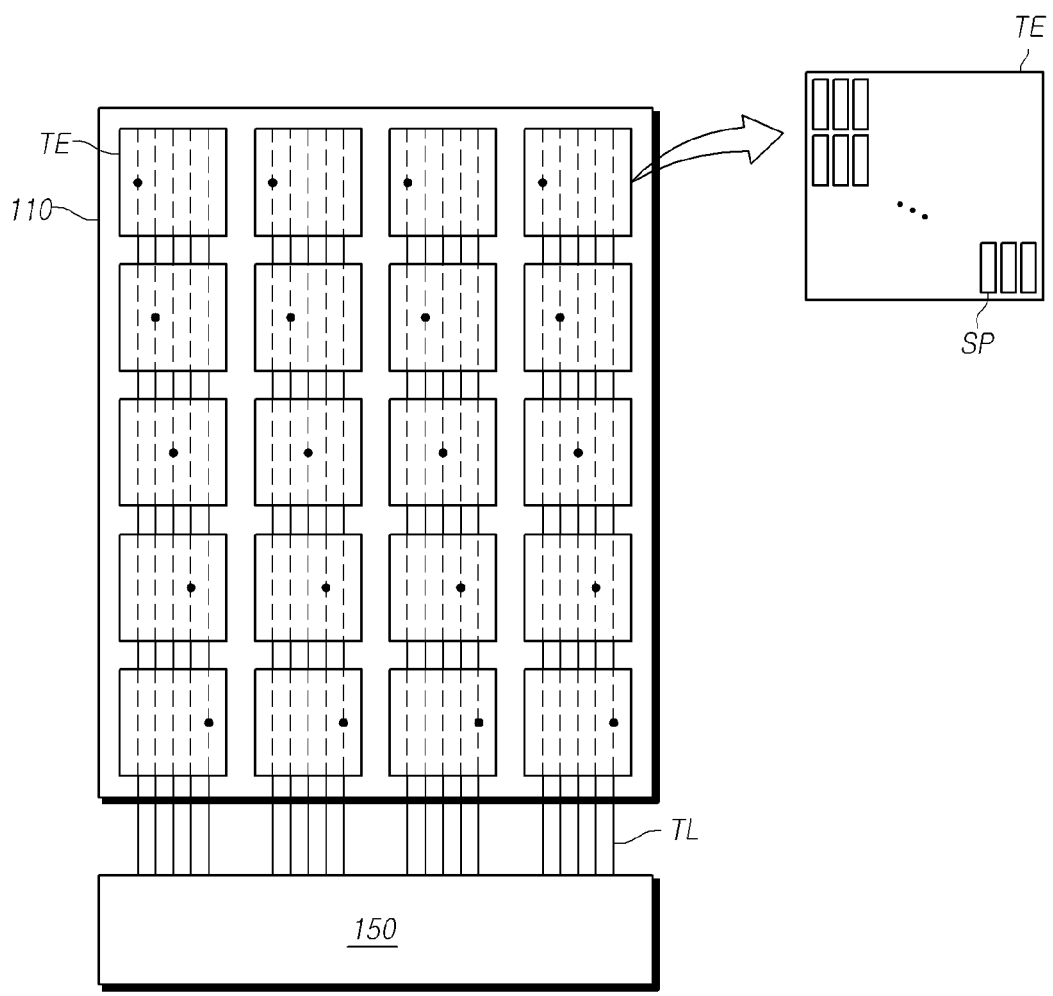
FIG. 2 is a diagram illustrating a configuration of touch electrodes in the touch display device according to embodiments of the present disclosure.

FIG. 2 is a diagram illustrating a configuration of the touch electrodes TE and the touch driver circuit 150 in the touch display device 100 according to embodiments of the present disclosure, in which the touch electrodes TE, are disposed in the touch display panel 110, and the touch driver circuit 150 drives the touch electrodes TE, to detect a touch.

Referring to FIG. 2, a plurality of touch electrodes TE, as well as a plurality of touch lines TL connecting the touch electrodes TE to the touch driver circuit 150, may be disposed in the touch display panel 110.

The touch electrodes TE may be disposed on or embedded in the touch display panel 110. In addition, the touch electrodes TE may be electrodes used for display driving or separately-disposed electrodes. In addition, each of the touch electrodes TE may have the shape of a transparent bulk electrode or an opaque mesh.

For example, when the touch display device 100 is an LCD device, the touch electrodes TE may be common electrodes COM embedded in the touch display panel 110, such that a common voltage Vcom is applied thereto during display driving.

That is, the common electrodes COM having a split structure may be disposed in the touch display panel 110 to be used as the touch electrodes TE, for touch sensing.

The touch electrodes TE are connected to the touch driver circuit 150 via the touch lines TL disposed in the touch display panel 110.

The touch driver circuit 150 may include a touch sensing circuit connected to the touch electrodes TE via the touch lines TL and a touch controller controlling the touch sensing circuit and detecting a touch. In addition, the touch driver circuit 150 may include a touch power circuit supplying a touch driving signal (TDS) to the touch sensing circuit under the control of the touch controller.

At least a portion of the touch driver circuit 150 may be integrated with the data driver circuit 130.

The touch sensing circuit outputs a touch driving signal (TDS) to the plurality of touch electrodes TE, and receives touch sensing signals (TSS) from the plurality of touch electrodes TE. The touch sensing circuit may perform touch sensing in time periods alternating with display driving periods in a time division manner, or may perform touch sensing simultaneously with display driving periods.

The touch sensing circuit may be connected to the touch electrodes TE, to receive the touch sensing signals (TSS). That is, the touch sensing circuit may output the touch driving signal (TDS) to the plurality of touch electrodes TE via the touch lines TL, receive the touch sensing signals (TSS) from the plurality of touch electrodes TE via the touch lines TL, and sense a touch-induced change in self-capacitance via the touch lines TL.

Alternatively, the touch electrodes TE may be divided into driving electrodes and sensing electrodes, to which the touch sensing circuit is connected. In this case, the touch sensing circuit may output the touch driving signal (TDS) to the driving electrodes, receive the touch sensing signals (TSS) from the sensing electrodes, and sense a change in mutual capacitance between the driving electrodes and the sensing electrodes, induced by a touch.

The touch sensing circuit converts received touch sensing signals (TSS) into digital sensing data and transmits the converted sensing data to the touch controller.

The touch controller may control the driving of the touch sensing circuit, receive sensing data from the touch sensing circuit, and detect a user's touch, input to the touch display panel 110, based on the received sensing data.

That is, the touch controller may detect a change in self-capacitance or mutual capacitance from the sensing data, and detect a touch, touch coordinates, or the like, based on the detected change in capacitance.

Touch sensing by the touch driver circuit 150 may be performed in time periods alternating with display driving periods in a time division manner or simultaneously with display driving.

Figure 3:
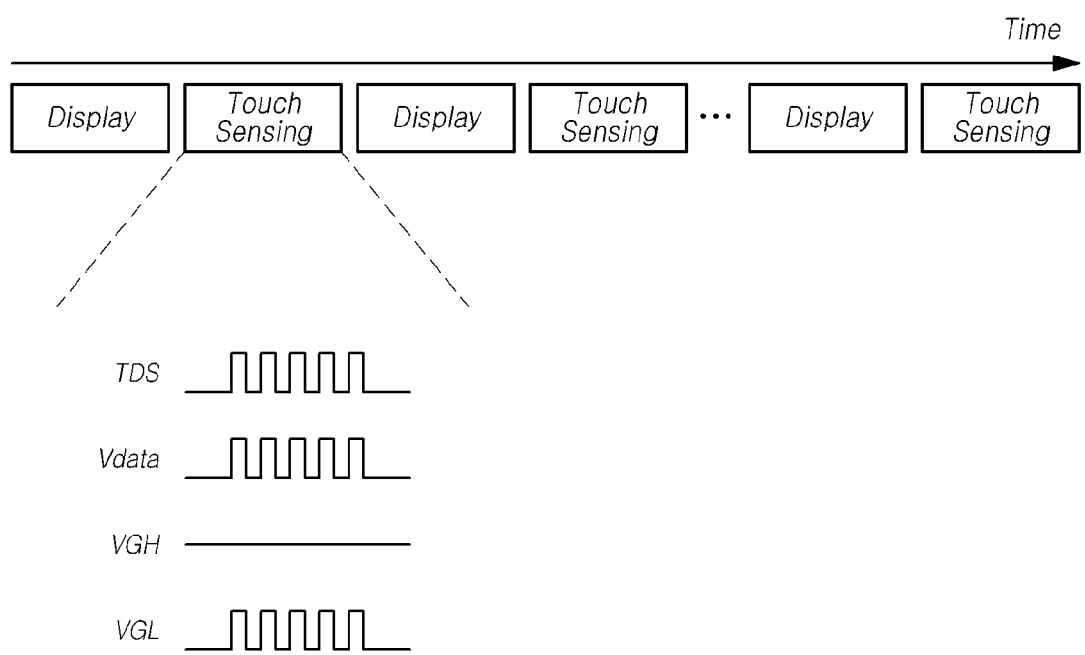
FIG. 3 illustrates an example of display driving and touch sensing timing in the touch display device according to embodiments of the present disclosure.

FIG. 3 is an example of display driving and touch sensing timing in the touch display device 100 according to embodiments of the present disclosure, illustrating a case in which the display driving and the touch sensing are performed during time division periods.

Referring to FIG. 3, the touch display device 100 according to embodiments of the present disclosure may perform touch sensing by driving the touch electrodes TE, included in the touch display panel 110 during a period (for example, a blank period) between display driving periods.

In an example, the touch display device 100 may perform touch sensing during a vertical blank period present in one image frame. Alternatively, touch sensing may be performed during some horizontal blank periods of a plurality of horizontal blank periods present in one image frame.

When a common electrode included in the touch display panel 110 is used as a touch electrode TE, a common voltage Vcom may be applied to the touch electrode TE, during the display driving period, and the touch driving signal TDS may be applied to the touch electrode TE, during the touch sensing period.

The touch driving signal TDS may be a pulse-type signal of which a magnitude of a voltage varies according to a time.

Here, since the display driving is not performed during the touch sensing period, a voltage may not be applied to an electrode for the display driving, the signal line or the like, or the signal line or the like may be in a constant voltage state. Therefore, parasitic capacitance Cp may be generated between the touch electrode TE and each of a gate line GL and a data line DL. Due to the parasitic capacitance Cp, detection performance of the touch sensing signal TSS may be degraded.

In order to prevent the parasitic capacitance Cp from occurring between the touch electrode TE, and each of the gate line GL and the data line DL, a signal having the same voltage and phase as the touch driving signal TDS applied to the touch electrode TE during the touch sensing period may be supplied to the gate line GL, the data line DL, and the like.

That is, as shown in FIG. 3, the data voltage Vdata having the same voltage and phase as the touch driving signal TDS may be supplied to the data line DL during the touch sensing period. Since a gate low voltage VGL is applied to the gate line GL during the touch sensing period, a signal having the same voltage and phase as the touch driving signal TDS may be output as the gate low voltage VGL.

As described above, since the signal having the same voltage and phase as the touch driving signal TDS is supplied to the gate line GL, the data line DL, and the like during the touch sensing period, the parasitic capacitance Cp between the touch electrode TE and the signal lines may be prevented from occurring. Accordingly, the detection performance of the touch sensing signal TSS may be improved.

The touch display device 100 may simultaneously perform the display driving and the touch sensing.

Figure 4:
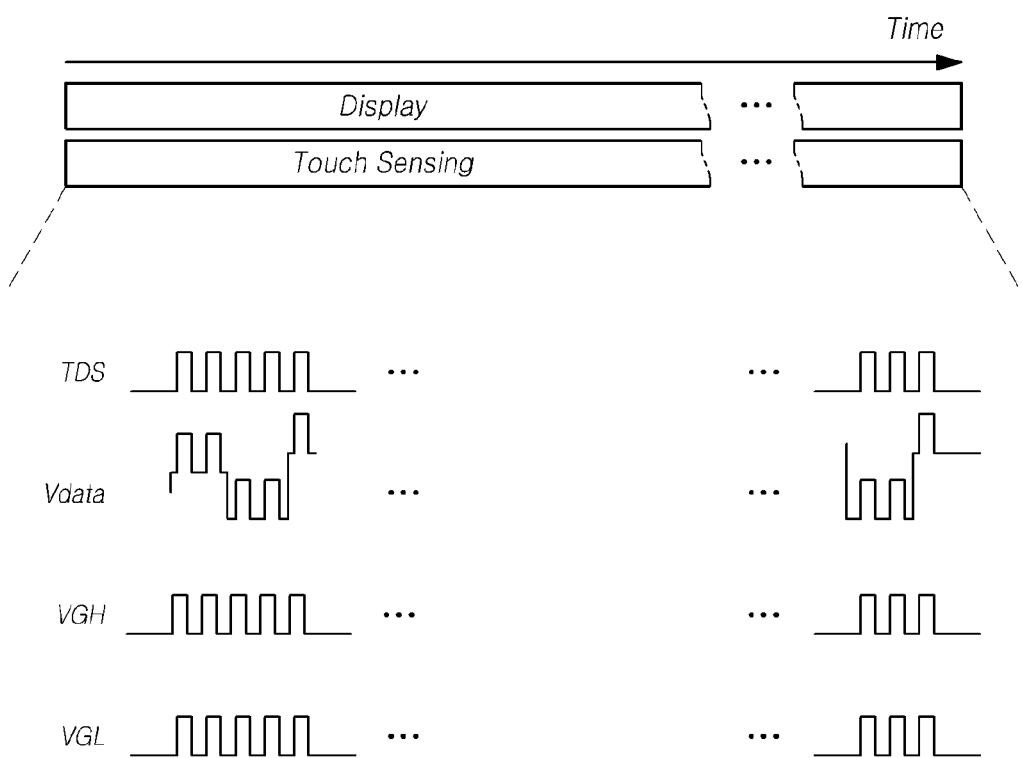
FIG. 4 illustrates another example of display driving and touch sensing timing in the touch display device according to embodiments of the present disclosure.

FIG. 4 is another example of display driving and touch sensing timing in the touch display device 100 according to embodiments of the present disclosure, illustrating a case in which the display driving and the touch sensing are simultaneously performed.

Referring to FIG. 4, the touch display device 100 according to embodiments of the present disclosure may perform the touch sensing simultaneously during a display driving period.

Here, a touch sensing period may be the same as the display driving period or may be a blank period between the display driving periods. That is, the touch sensing may be independently performed regardless of the display driving, and thus, the touch sensing may be performed simultaneously with the display driving.

When the touch sensing is performed simultaneously with the display driving, a touch driving signal TDS is applied to the touch electrode TE. A data voltage Vdata may be supplied to the data line DL for the display driving, and a gate high voltage VGH, a gate low voltage VGH, and the like used for outputting a scan signal applied to the gate line GL may be output.

In this case, when a common electrode COM included in the touch display panel 110 is used as a touch electrode 1E, the touch driving signal TDS may be applied to the touch electrode TE. Thus, a voltage difference corresponding to an image data may not be caused between the common electrode COM and a pixel electrode PXL to which the data voltage Vdata is applied.

That is, since a voltage of the touch driving signal TDS varies with a time, the voltage difference corresponding to the image data may not be caused between the common electrode COM to which the touch driving signal TDS is applied and the pixel electrode PXL. Thus, the subpixel SP may not display brightness corresponding to the image data.

Therefore, the data voltage Vdata modulated based on the touch driving signal TDS may be supplied to the data line DL, and thus, the voltage difference corresponding to the image data may be caused between the common electrode COM to which the touch driving signal TDS is applied and the pixel electrode PXL.

The modulation of the data voltage Vdata may be performed, for example, through a method of modulating a gamma voltage used to generate the data voltage Vdata in the data driver circuit 130. Alternatively, the modulated data voltage Vdata may be supplied to the data line DL by modulating a voltage of a ground disposed in the touch display panel 110.

In addition, the gate high voltage VGH and the gate low voltage VGL used to generate the scan signal supplied to the gate line GL may be modulated based on the touch driving signal TDS, and thus, a modulated scan signal may be applied to the gate line GL to normally drive the gate line GL.

As described above, the data voltage Vdata applied to the data line DL and the gate high voltage VGH and the gate low voltage VGL applied to the gate line GL and used to generate the scan signal may be modulated based on the touch driving signal TDS, thereby simultaneously performing the display driving and the touch sensing.

Figure 5:
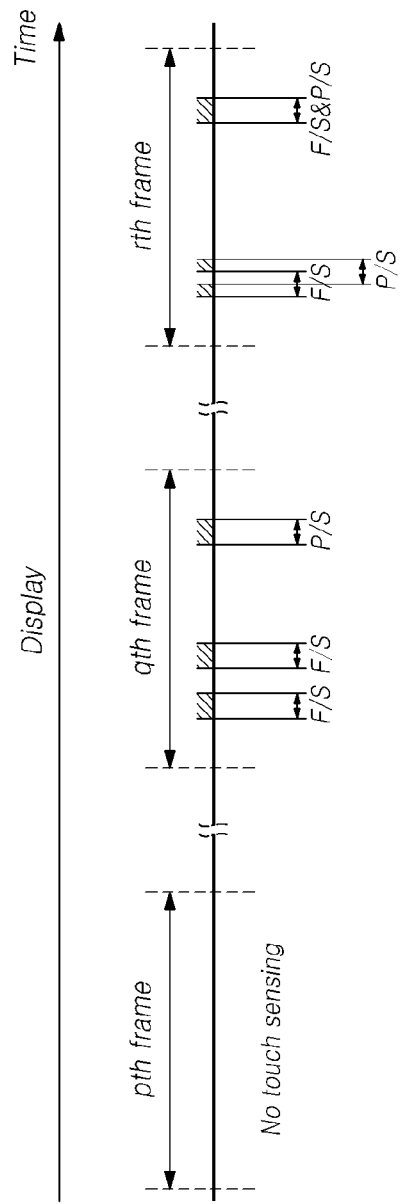
FIG. 5 illustrates various examples of various types of timing of finger sensing and pen sensing, based on the display driving and the touch sensing timing illustrated in FIG. 4 according to the embodiments of the present disclosure.

FIG. 5 illustrates various examples of various types of timing of finger sensing F/S and pen sensing P/S, based on the display driving and the touch sensing timing illustrated in FIG. 4.

Referring to FIG. 5, the touch display device 100 according to embodiments of the present disclosure may perform only display driving or may simultaneously perform touch sensing simultaneously with the display driving. The touch sensing may be performed during a portion of a display driving period and may perform the finger sensing F/S and the pen sensing P/S during different periods or the same period.

In an example, the touch display device 100 may perform the display driving without performing touch sensing such as the finger sensing F/S or the pen sensing P/S during one frame such as a pth frame Alternatively, the touch display device 100 may perform touch sensing such as the finger sensing F/S or the pen sensing P/S during a portion of the display driving period such as a qth frame, in which the touch sensing is required. Here, the finger sensing F/S and the pen sensing P/S may be performed during periods which do not overlap each other.

Alternatively, the touch display device 100 may perform touch sensing during the display driving period such as an rth frame and may perform the finger sensing F/S and the pen sensing P/S during an overlapping period. In this case, sensing results of the finger sensing F/S and the pen sensing P/S may be distinguished through a signal analysis according to an algorithm or a sensing position determined by the touch controller.

In addition to the examples, the display driving and the touch sensing (finger sensing or pen sensing) may be independently performed at various timings.

Accordingly, the touch display device 100 according to embodiments of the present disclosure may perform the touch sensing simultaneously with the display driving. However, in this case, due to the parasitic capacitance Cp generated between the signal line to which a signal for display driving is applied and the touch line TL, noise may be generated in a touch sensing signal TSS.

For example, the parasitic capacitance Cp generated by the data line DL disposed in the same direction as the touch line TL may affect the touch sensing signal TSS.

The touch display device 100 according to embodiments of the present disclosure performs the touch sensing independently from the display driving and provides a scheme of improving performance of the touch sensing by preventing the parasitic capacitance Cp between the signal line for the display driving and the touch line TL and preventing display noise of the touch sensing signal TSS, caused by the parasitic capacitance Cp.

Figure 6:
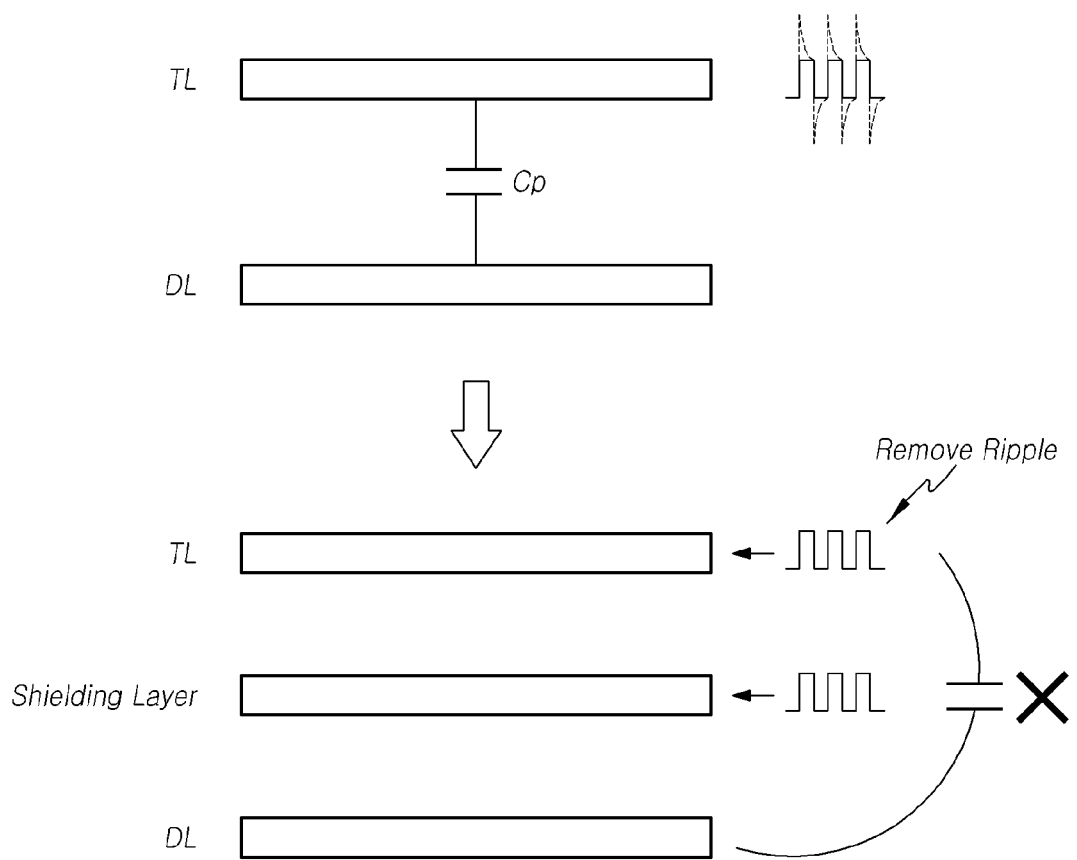
FIG. 6 is a conceptual diagram illustrating a structure for preventing parasitic capacitance between a touch line and a data line, as well as display noise of a touch sensing signal, in the touch display device according to embodiments of the present disclosure.

FIG. 6 is a conceptual diagram illustrating a structure for preventing parasitic capacitance Cp between the touch line TL and the data line DL, as well as display noise of a touch sensing signal TSS, in the touch display device 100 according to embodiments of the present disclosure.

Referring to FIG. 6, the data line DL may be disposed in one direction (in other words: extend in one direction), and the touch line TL may be disposed in the same direction (in other words: extend in the same direction) as the data line DL in the touch display device 100 according to embodiments of the present disclosure. The data line DL and the touch line TL may be disposed such that at least portions thereof overlap with each other in order to secure an aperture ratio.

Therefore, parasitic capacitance Cp may be generated between the data line DL to which a data voltage Vdata is applied and the touch line TL to which a touch driving signal TDS is applied. As the parasitic capacitance Cp is generated, a ripple due to a variation in data voltage Vdata applied to the data line DL may cause noise in a touch sensing signal TSS detected through the touch line TL.

In order to prevent the display noise of the touch sensing signal TSS due to the parasitic capacitance Cp, the touch display device 100 according to embodiments of the present disclosure includes a shielding layer (or a shielding pattern) disposed between the touch line TL and the data line DL.

The shielding pattern may be disposed between the data line DL and the touch line TL and disposed such that a portion thereof overlaps at least a portion of the data line DL and the touch line TL. In addition, the shielding pattern may be disposed to overlap a region in which the data line DL and the touch line TL overlap each other.

The shielding pattern may be disposed between the data line DL and the touch line TL, thereby preventing the parasitic capacitance CP from being directly generated between the data line DL and the touch line TL. The parasitic capacitance Cp may be prevented between the data line DL and the touch line TL, thereby preventing the ripple due to the variation in data voltage Vdata applied to the data line DL from causing the display noise of the touch sensing signal TSS.

In addition, a signal corresponding to the touch driving signal TDS applied to the touch line TL may be applied to the shielding pattern. Here, the signal corresponding to the touch driving signal TDS may be a signal having the same frequency and phase as the touch driving signal TDS. The signal may have the same amplitude as the touch driving signal TDS. That is, a signal having the same frequency, phase and amplitude may be applied to the shielding pattern and the touch line TL. For example, the signal applied to the shielding pattern may be the same signal as the touch driving signal TDS.

The signal applied to the shielding pattern may be output from the touch driver circuit 150 or a driving circuit separately disposed and may be applied to the shielding pattern. Alternatively, the shielding pattern may be connected to the touch electrode TE, overlapping with the shielding pattern through a contact hole or the like so that the signal corresponding to the touch driving signal TDS may be applied to the shielding pattern.

As described above, since the signal corresponding to the touch driving signal TDS is applied to the shielding pattern, capacitance may not be generated between the shielding pattern and the touch line TL. Therefore, the shielding pattern does not affect the touch sensing signal TSS detected through the touch line TL and may shield an influence of a ripple due to a variation in voltage of the data line DL on the touch line TL.

Therefore, it is possible to prevent the parasitic capacitance Cp due to the data line DL from acting as noise in the touch sensing signal TSS through the shielding pattern and improve sensitivity of the touch sensing signal, thereby improving performance of the touch sensing.

Although the above example has illustrated a structure in which the shielding pattern is disposed between the data line DL and the touch line TL, the shielding pattern may be applied on a line (e.g. a gate line GL) which may form the parasitic capacitance Cp together with the touch line TL among lines to which a signal or a voltage for display driving is applied.

The touch display device 100 according to embodiments of the present disclosure provides a scheme of minimizing an increase in the number of masks due to the application of the shielding pattern and disposing the shielding pattern.

In addition, in a structure in which the shielding pattern is applied, a scheme of reducing a load of the touch line TL and preventing degradation of performance of display driving is provided.

Hereinafter, detailed structures of the touch display panel 110 and the touch display device 100 according to the embodiments of the present disclosure will be described with reference to FIGS. 7 to 15.

Figure 7:
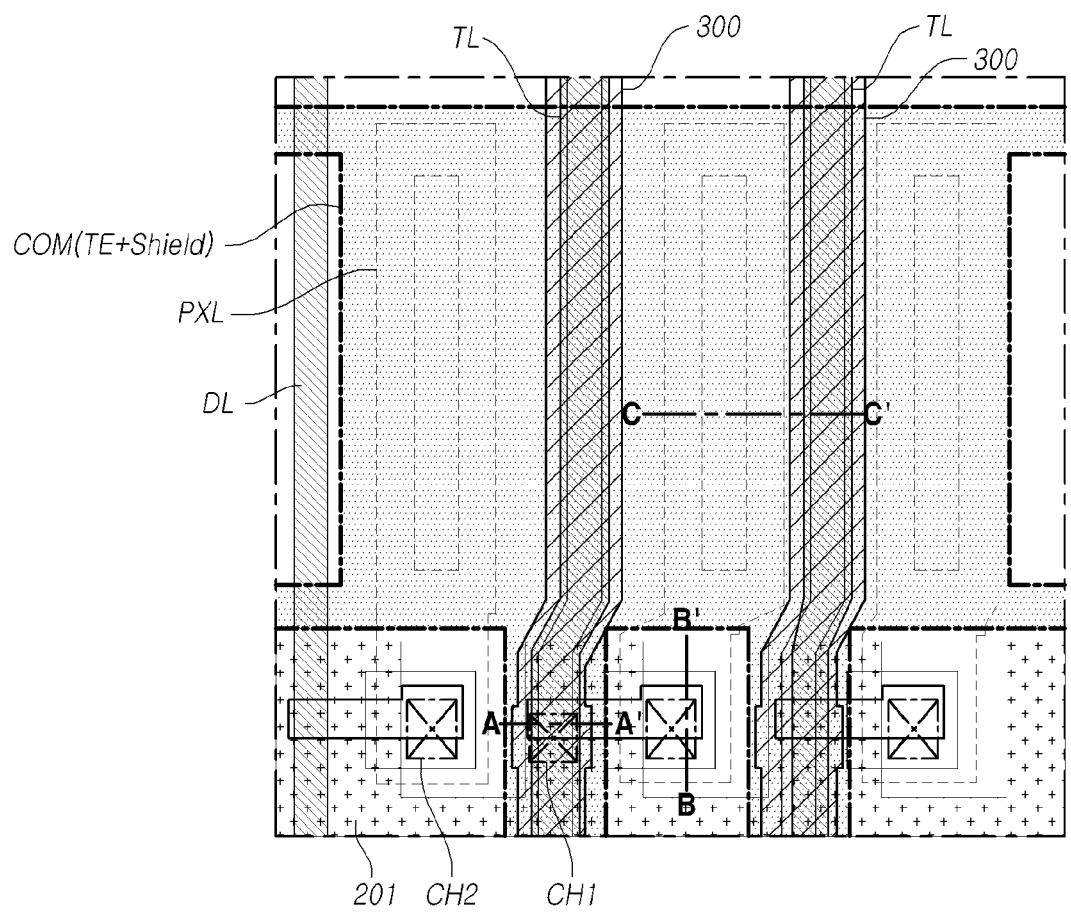
FIG. 7 illustrates an example of a planar structure in which a shielding pattern and a touch load reducing layer are disposed in the touch display device according to embodiments of the present disclosure.
Figure 8:
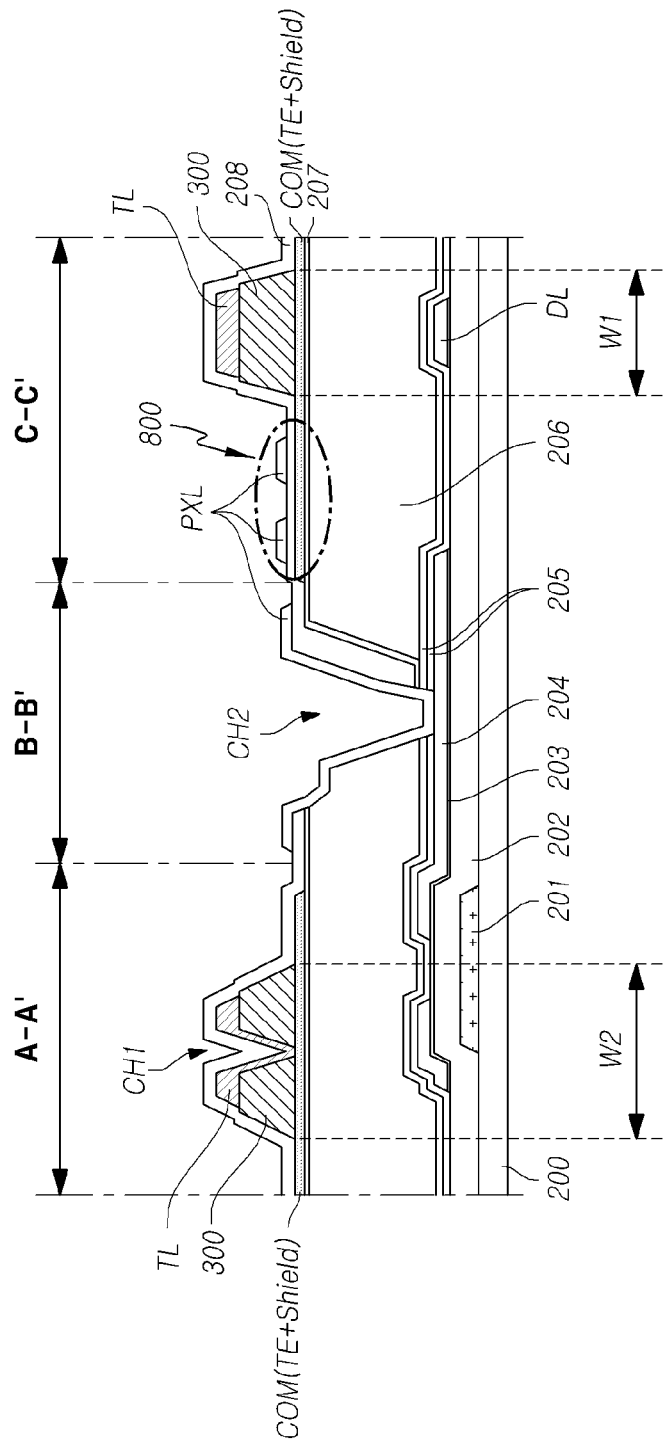
FIG. 8 illustrates an example cross-sectional structure of the touch display device illustrated in FIG. 7 according to the embodiments of the present disclosure.

FIGS. 7 and 8 illustrate an example of a structure in which the shielding pattern is disposed in the touch display device 100 according to embodiments of the present disclosure.

FIG. 7 illustrates an example of a planar structure in which three sub-pixels SP are disposed in the touch display device 100 according to embodiments of the present disclosure. FIG. 8 illustrates an example of the cross-sectional structure taken along line A-A', line B-B', and line C-C' in FIG. 7 according to embodiments of the present disclosure.

Referring to FIGS. 7 and 8, in the touch display device 100 according to embodiments of the present disclosure, a gate electrode 201 is disposed on a substrate 200, and a gate insulating layer 202 is disposed on the gate electrode 201. The gate electrode 201 may be electrically connected to a gate line GL or may be provided integrally with the gate line GL. A scan signal for driving a subpixel SP may be applied to the gate electrode 201.

An active layer 203 and a source/drain electrode 204 may be disposed on the gate insulating layer 202, and at least one first passivation layer 205 may be disposed on the source/drain electrode 204. The source/drain electrode 204 may be electrically connected to a data line DL or may be provided integrally with the data line DL and may apply a data voltage Vdata supplied through the data line DL to a pixel electrode PXL.

A planarization layer 206 may be disposed on the at least one first passivation layer 205, and at least one second passivation layer 207 may be disposed on the planarization layer 206.

A common electrode COM may be disposed on the at least one second passivation layer 207, and a pixel insulating layer 208 and the pixel electrode PXL may be disposed on the common electrode COM. The pixel insulating layer 208 may allow the common electrode COM and the pixel electrode PXL to be insulated from each other, and may also allow the touch line TL and the pixel electrode PXL to be insulated from each other. The pixel electrode PXL may be connected to the source/drain electrode 204 through a second contact hole CH2 and may be electrically connected to the data line DL. The pixel electrode PXL may be arranged to form an electric field with the common electrode COM.

Here, the common electrode COM may be a touch electrode TE to which a touch driving signal TDS for touch sensing is applied. That is, the common electrode COM may form an electric field together with the pixel electrode PXL to allow display driving to be performed, and may receive the touch driving signal TDS to allow touch sensing to be performed simultaneously during a display driving period or during a time division period.

Accordingly, the common electrode COM may be electrically connected to the touch line TL and may receive the touch driving signal TDS supplied through the touch line TL.

In this case, a portion of the common electrode COM may be disposed between the touch line TL and the data line DL. In addition, a portion of the common electrode COM may be disposed to overlap a region in which the touch line TL and the data line DL overlap each other.

That is, the common electrode COM may provide a function of the touch electrode TE, and concurrently, a portion of the common electrode COM may be disposed between the data line DL and the touch line TL to provide a function of a shielding pattern. In other words, the common electrode COM may be extended not only to an area for forming the electric field with the pixel electrode PXL, but also to an area where the data line DL and the touch line TL overlap.

As described above, since a portion of the common electrode COM provides the function of the shielding pattern, the shielding pattern for preventing the parasitic capacitance Cp between the touch line TL and the data line DL may be implemented without increasing the number of masks.

Here, a touch load reduction layer 300 for reducing a load of the touch line TL may be disposed between the common electrode COM and the touch line TL. The touch load reduction layer 300 may be disposed using an insulating film. In an embodiment, a widest width of the touch load reduction layer 300 is wider than a widest width of the touch line TL. In an embodiment, the touch load reduction layer 300 overlaps an entire length of the touch line TL, as shown in FIG. 7. The touch load reduction layer 300 may be disposed using an inorganic film (for example, SiNx, SiO2, or the like) or an organic film (for example, N-PAC(Negative Type Photoacryl), Photoacryl or the like). The load of the touch line TL may be reduced by forming a certain height between the common electrode COM and the touch line TL. The height between the common electrode COM and the touch line TL may correspond to a thickness of the touch load reduction layer 300. In an embodiment, the touch load reduction layer 300 is made of an inorganic film and has a thickness in a range of 50 nm to 1000 nm. In another embodiment, the touch load reduction layer 300 is made of an organic film and has a thickness in a range of 1000 nm to 3000 nm. In still another embodiment, the touch load reduction layer 300 is made of an inorganic film and an organic film and has a thickness in a range of 1050 nm to 4000 nm. The touch line TL and the common electrode COM may be electrically connected to each other through a first contact hole CH1 provided in the touch load reduction layer 300.

The touch line TL and the common electrode COM may be electrically connected to each other through a first contact hole CH1 provided in the touch load reduction layer 300.

Each of the plurality of touch lines TL is electrically connected to one common electrode COM of the common electrodes COM functioning as the touch electrodes TE, through at least one contact hole. Since the touch load reduction layer 300 is disposed between the touch line TL and the common electrode COM, the touch line TL and the common electrode COM may be electrically connected to each other through the first contact hole CH1 provided in the touch load reduction layer 300.

In the touch load reduction layer 300, a first width W1 of a portion in which the first contact hole CH1 is not provided may be less than a second width W2 of a portion in which the first contact hole CH1 is provided. As described above, since the second width W2 of the portion in which the first contact hole CH1 is provided is greater than the first width W1, the first contact hole CH1 may be easily provided.

In addition, a width of a portion of the touch load reduction layer 300 may be the same for each of the touch load reduction layers 300. That is, portions corresponding to a portion of any one touch load reduction layer 300, in which the first contact hole CH1 is provided, may all have the same second width W2, thereby preventing an influence on image quality.

On the other hand, the touch load reduction layer 300 disposed between the touch line TL and the common electrode COM may not be disposed in a region in which the common electrode COM and the pixel electrode PXL overlap each other.

This is because when the touch load reduction layer 300 is disposed between the common electrode COM and the pixel electrode PXL, a distance between the common electrode COM and the pixel electrode PXL is increased to reduce performance of display driving. Therefore, the touch load reduction layer 300 may not be disposed in a liquid crystal driving region 800, i.e., a region in which the common electrode COM and the pixel electrode PXL overlap each other.

That is, in the touch display device 100 according to embodiments of the present disclosure, since the portion of the common electrode COM is disposed between the touch line TL and the data line DL, the common electrode COM may provide the function of the shielding pattern, thereby improving performance of touch sensing.

Furthermore, the touch load reduction layer 300 may be disposed on the common electrode COM and may be disposed in a region except for the region in which the common electrode COM and the pixel electrode PXL overlap each other.

The touch load reduction layer 300 may be disposed in a region in which the common electrode COM and the touch line TL overlap each other.

Accordingly, a load between the shielding pattern and the touch line TL may be reduced to improve performance of touch sensing, and due to the placement of the touch load reduction layer 300, performance of display driving performance may be prevented from being influenced.

In an embodiment, in a cross-sectional view (e.g., the cross-sectional view C-C' in FIG. 8), a first edge (e.g., a left edge) of the touch load reducing layer 300 protrudes from a first edge (e.g., a left edge) of the touch line TL and a second edge (e.g., a right edge) of the touch load reducing layer 300 protrudes from a second edge (e.g., a right edge) of the touch line TL, wherein a distance between the first edge of the touch line TL and the first edge of the touch load reducing layer 300 is smaller than a distance between the first edge of the touch line TL and the second edge of the touch load reducing layer 300, and wherein a distance between the second edge of the touch line TL and the second edge of the touch load reducing layer 300 is smaller than a distance between the second edge of the touch line TL and the first edge of the touch load reducing layer 300. The cross-section corresponding to the cross-sectional view may be perpendicular to a direction of the touch line TL, as shown in FIG. 7 (which shows that the cross-section along C-C' is perpendicular to the direction of the touch line TL).

As shown in FIG. 7, the touch load reduction layer 300 may be disposed for each sub-pixel SP. However, in some cases, the touch line TL may not be disposed for each sub-pixel SP, so that the touch load reduction layer 300 disposed below the touch line TL may also be disposed every at least two sub pixels SP.

Figure 9:
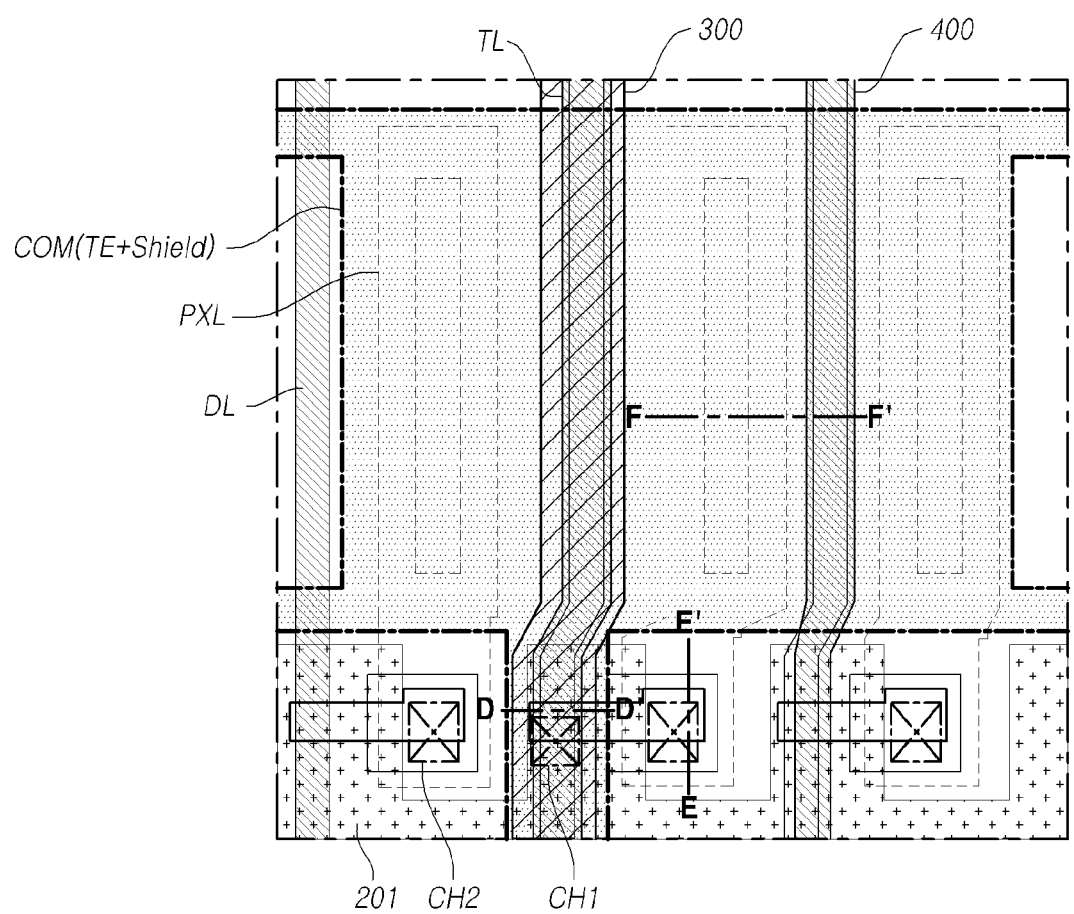
FIG. 9 illustrates another example of a planar structure in which a shielding pattern and a touch load reducing layer are disposed in the touch display device according to embodiments of the present disclosure.
Figure 10:
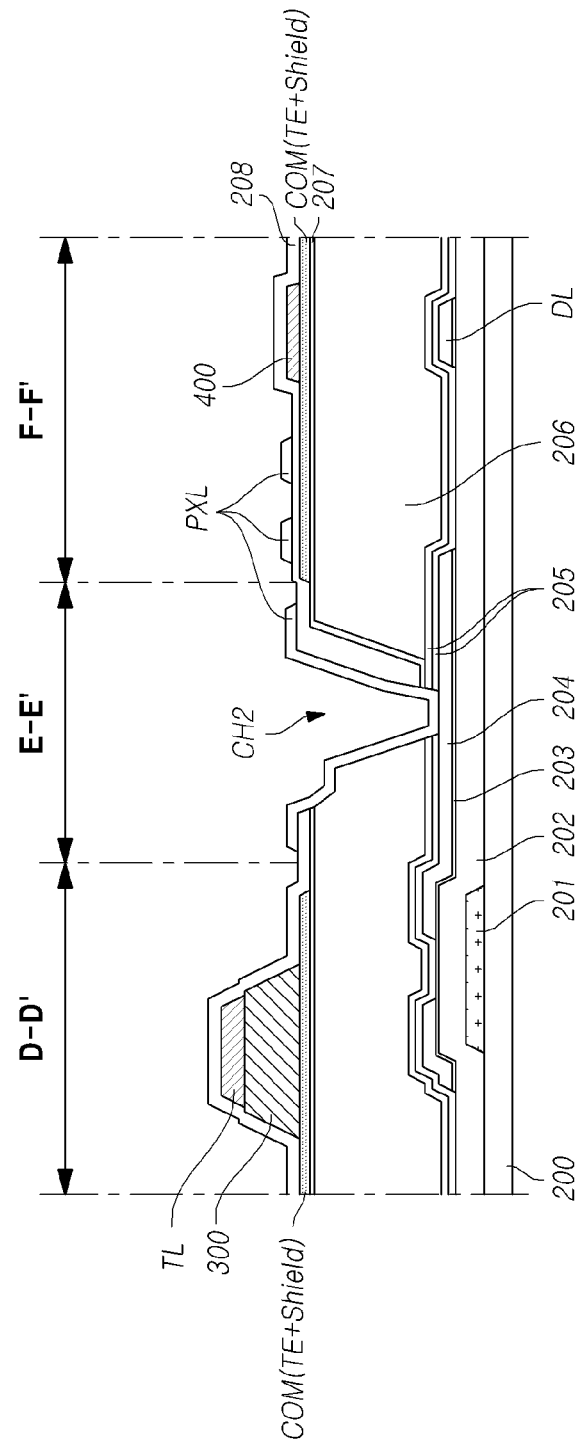
FIG. 10 illustrates an example cross-sectional structure of the touch display device illustrated in FIG. 9 according to the embodiments of the present disclosure.

FIGS. 9 and 10 illustrate another example of a structure in which a shielding pattern and a touch load reduction layer 300 are disposed in the touch display device 100 according to embodiments of the present disclosure.

FIG. 9 illustrates an example of a planar structure in which one touch load reduction layer 300 is disposed in three adjacent subpixels SP. FIG. 10 illustrates an example of the cross-sectional structure taken along line A-A', line B-B', and line C-C' in FIG. 9 according to embodiments of the present disclosure.

Referring to FIGS. 9 and 10, one touch line TL may be disposed in a region in which three adjacent sub-pixels SP are disposed. That is, the touch lines TL may not be disposed in every region in which a data line DL is provided but may be disposed only on some data lines DL.

A common electrode COM may be disposed between the touch line TL and the data line DL to prevent parasitic capacitance Cp from occurring between the touch line TL and the data line DL.

In addition, the touch-load reduction layer 300 may be disposed between the touch line TL and the common electrode COM in every region in which the touch line TL is disposed. That is, the touch load reduction layer 300 may be disposed only in the region in which the touch line TL is disposed.

As described above, when the touch lines TL are disposed only on some data lines DL, a common electrode compensation pattern 400 for reducing the resistance of the common electrode COM may be provided in a region in which a touch line TL is not disposed.

The common electrode compensation pattern 400 may be disposed in contact with the common electrode COM in the region in which the touch line TL is not disposed on the data line DL. In addition, the common electrode compensation pattern 400 may be provided of the same material as the touch line TL.

That is, in a process of disposing the touch line TL, the common electrode compensation pattern 400 may be made of the same material as the touch line TL in the region in which the touch line TL is not disposed, and thus, it may be possible to provide a structure for reducing a resistance of the common electrode COM without adding a separate process.

The common electrode compensation pattern 400 may be disposed to be insulated from other portions of the common electrodes COM except the portion of the common electrode COM being in contact with the common electrode compensation pattern 400. And an edge portion of the common electrode compensation pattern 400 may be located inside a border of the contacted common electrode COM or outside the border of the contacted common electrode COM. That is, the common electrode compensation pattern 400 may be disposed as a structure protruding outside of the contacted common electrode COM, not protruding outside of the contacted common electrode COM, or aligning with the border of the contacted common electrode COM. In other words, the common electrode compensation pattern 400 may be confined within the border of the common electrode COM, extend past the border of the common electrode COM, or extend to the border of the common electrode COM such that the common electrode compensation pattern 400 is aligned with the border of the common electrode COM.

On the other hand, since the common electrode COM is disposed below the pixel electrode PXL in order to provide a function of a shielding pattern, a pattern for connecting the pixel electrode PXL and a source/drain electrode 204 may be provided in the process of disposing the common electrode COM.

Figure 11:
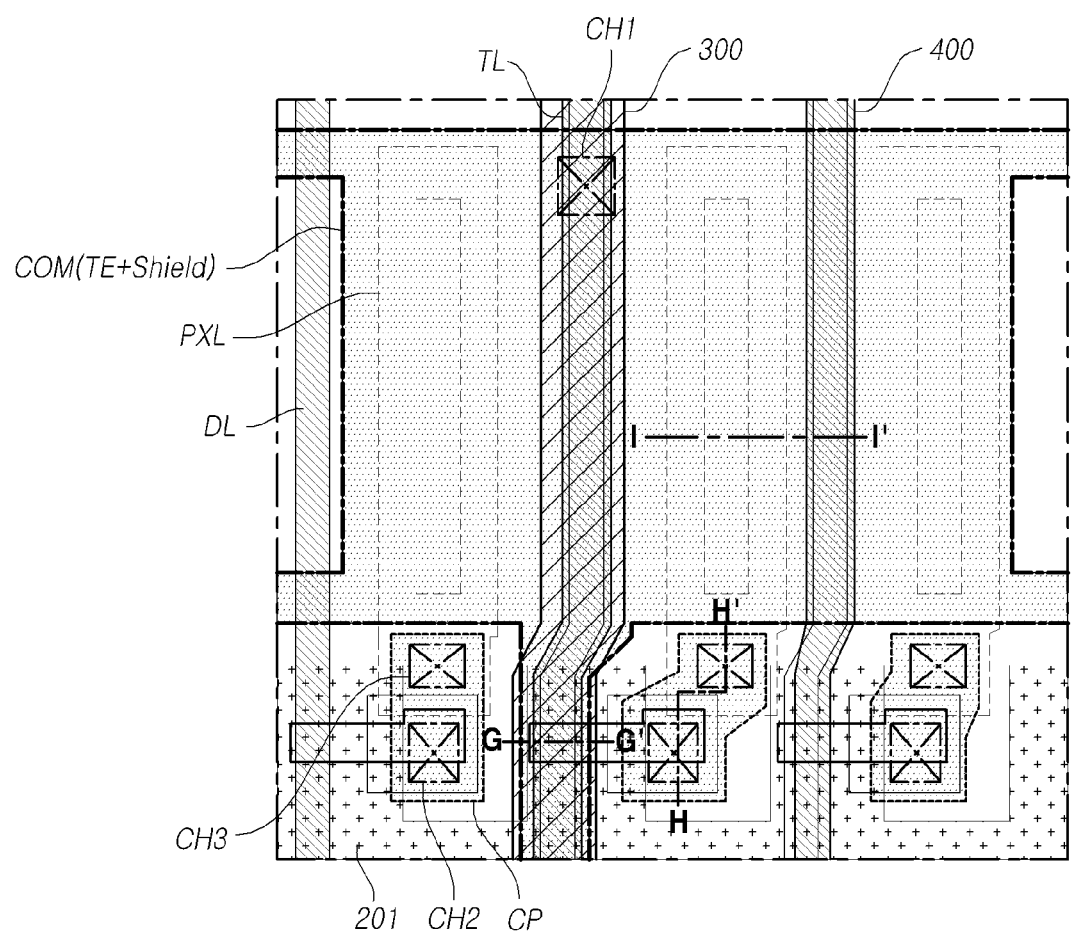
FIG. 11 illustrates further another example of a planar structure in which a shielding pattern and a touch load reducing layer are disposed in the touch display device according to embodiments of the present disclosure.
Figure 12:
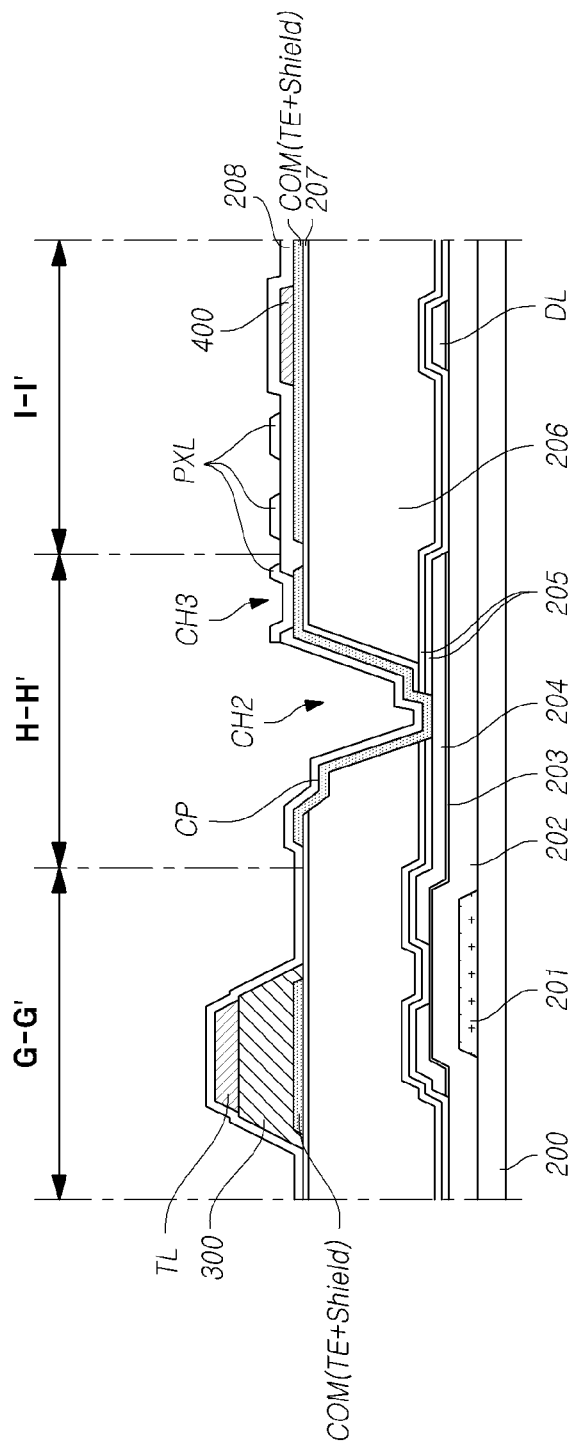
FIG. 12 illustrates an example cross-sectional structure of the touch display device illustrated in FIG. 11 according to the embodiments of the present disclosure.

FIGS. 11 and 12 illustrate another example of a structure in which a shielding pattern and a touch load reduction layer 300 are disposed in the touch display device 100 according to embodiments of the present disclosure.

FIG. 11 illustrates an example of a planar structure in which a pixel electrode PXL is connected to a source/drain electrode 204 through a connection pattern CP. FIG. 12 illustrates an example of the cross-sectional structure taken along line G-G', line H-H', and line I-I' in FIG. 11 according to embodiments of the present disclosure.

Referring to FIGS. 11 and 12, in the touch display device 100 according to embodiments of the present disclosure, the pixel electrode PXL may be directly connected to the source/drain electrode 204 or be connected through the connection pattern CP.

In an example, a second passivation layer 207 is disposed on a planarization layer 206, and the common electrode COM is disposed on the second passivation layer 207.

In this case, the connection pattern CP insulated from the common electrode COM may be disposed on at least a portion of each of the planarization layer 206 and the second passivation layer 207. The connection pattern CP may be made of the same material as the common electrode COM.

A pixel insulating layer 208 is disposed on the connection pattern CP, and the pixel electrode PXL is disposed on the pixel insulating layer 208. The pixel electrode PXL and the connection pattern CP may be connected through a third contact hole CH3 provided in the pixel insulating layer 208.

The connection pattern CP may be disposed in a process of disposing the common electrode COM disposed below the pixel electrode PXL, and the pixel electrode PXL and the source/drain electrode 204 may be connected to each other through the connection pattern CP, thereby easily disposing the pixel electrode PXL.

In this case, as a contact hole for connecting the pixel electrode PXL and the source/drain electrode 204 is increased, a first contact hole CH1 for connecting the touch line TL and the common electrode COM is disposed in a different region.

That is, as in the example shown in FIG. 11, the first contact hole CH1 may not be disposed in a region where a gate electrode 201 is disposed but may be disposed in an upper region of a subpixel SP. The contact hole for connecting the pixel electrode PXL and the source/drain electrode 204 may be easily provided through such a structure. Specifically, the first contact hole CH1 may be disposed in a non-opening area between subpixels SP. In other words, the first contact hole CH1 may be disposed in any area where the touch line TL and the common electrode COM overlap, and may be disposed in various areas according to positions of other contact holes included in a subpixel SP.

In addition, a touch load reduction layer 300 disposed below the touch line TL may be disposed in a shape which surrounds the common electrode COM disposed below the touch load reduction layer 300.

That is, as in an example of a cross section taken along line G-G' shown in FIG. 12, the common electrode COM may be disposed to have an area capable of preventing parasitic capacitance Cp from occurring between the touch line TL and the data line DL, and the touch load reduction layer 300 may be disposed in the shape which surrounds the common electrode COM.

As described above, the touch load reduction layer 300 may be disposed in the shape which surrounding the common electrode COM so that it is possible to prevent the touch line TL and the common electrode COM from being shorted to each other, wherein the touch line TL is disposed on the touch load reduction layer 300 and the common electrode COM is disposed below the touch load reduction layer 300 and is not connected to the touch line TL.

A structure capable of preventing a short circuit between the touch line TL and the common electrode COM may be provided to increase a degree of freedom of a width of the touch line TL and the touch load reduction layer 300, thereby providing design or process convenience.

The effect of the degree of freedom of a process of the touch line TL and the touch load reduction layer 300 may be provided by additionally disposing an insulating layer between the touch-line TL and the touch load reduction layer 300.

Figure 13:
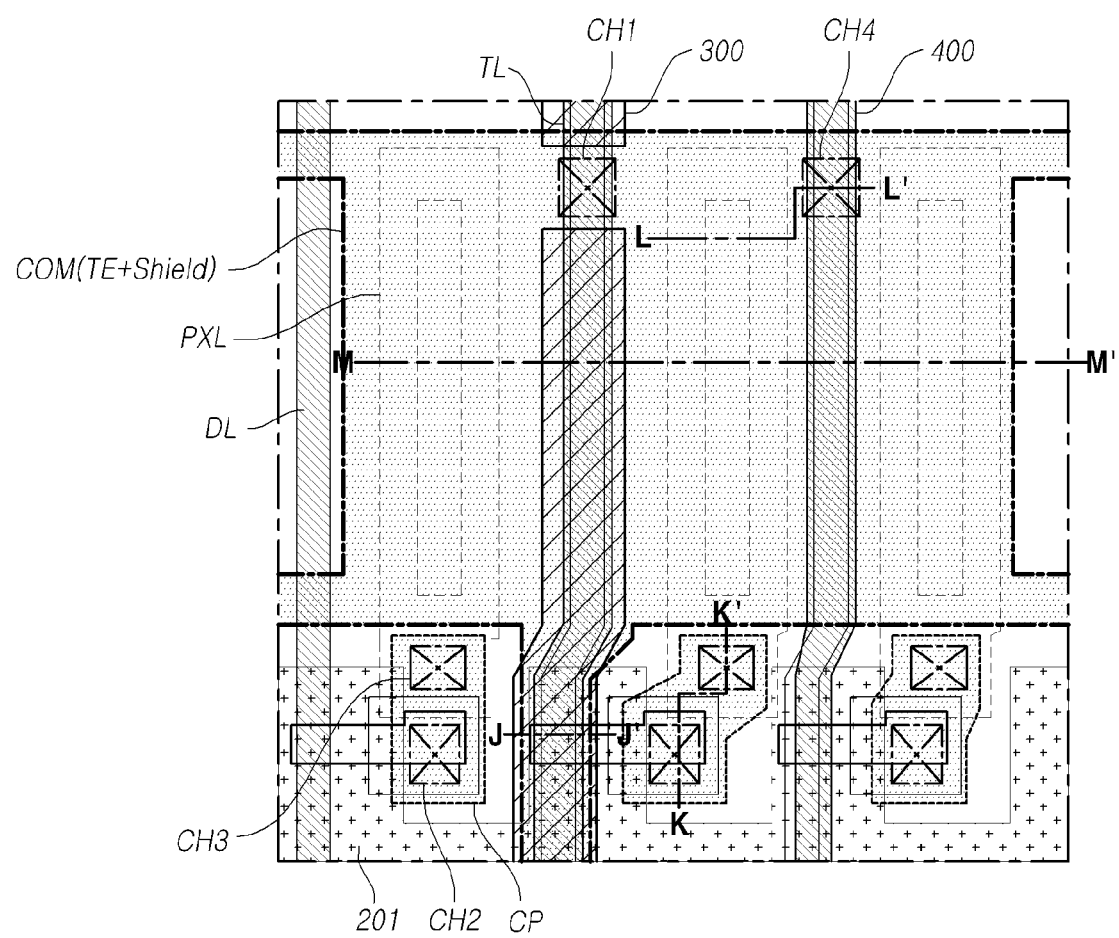
FIG. 13 illustrates another example of a planar structure in which a shielding pattern and a touch load reducing layer are disposed in the touch display device according to embodiments of the present disclosure.
Figure 14:
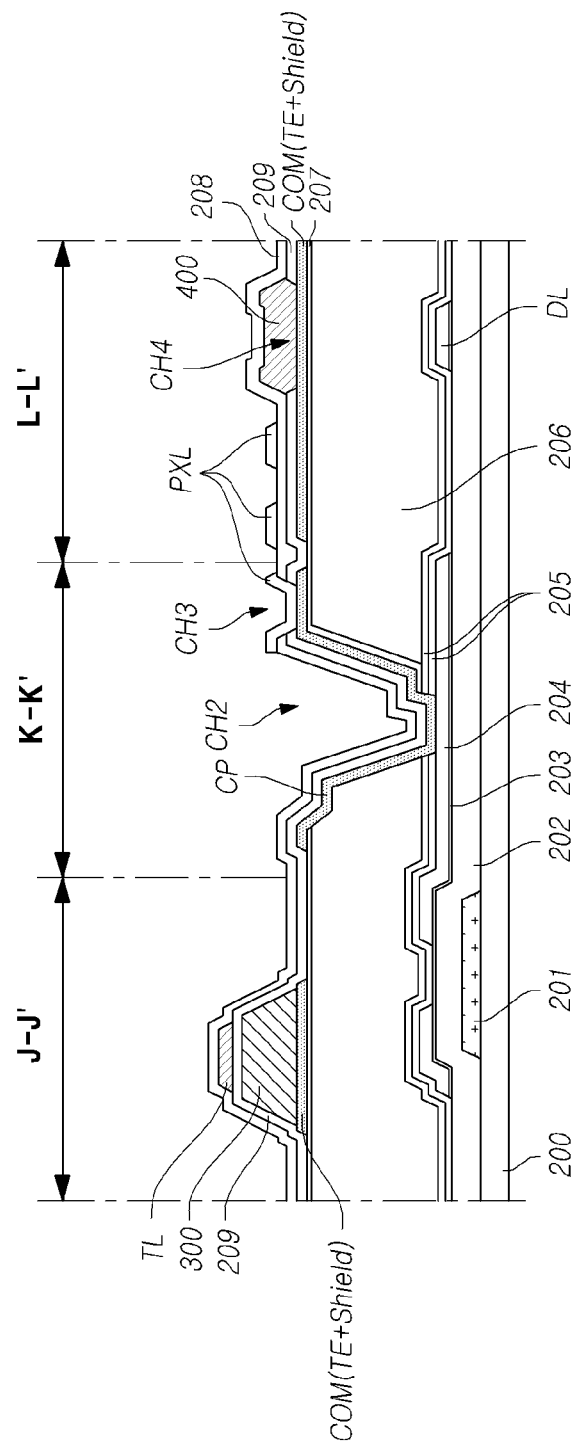
FIG. 14 illustrates an example cross-sectional structure of the touch display device illustrated in FIG. 13 according to the embodiments of the present disclosure.
Figure 15:
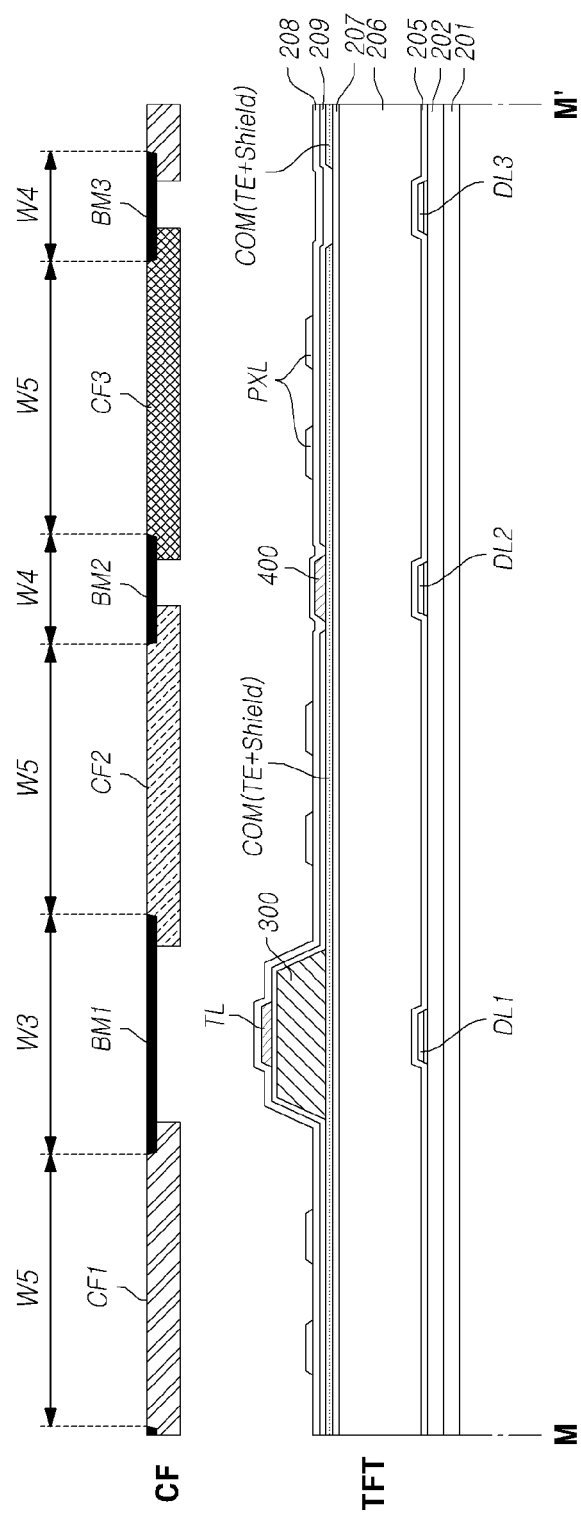
FIG. 15 illustrates another example cross-sectional structure of the touch display device illustrated in FIG. 13 according to the embodiments of the present disclosure.

FIGS. 13 to 15 illustrate other example structures including a shielding pattern and a touch load reduction layer 300 in the touch display device 100 according to embodiments of the present disclosure.

FIG. 13 illustrates an example of a planar structure in which a touch line insulation layer 209 is disposed below the touch lines TL, FIG. 14 illustrates an example of a cross-sectional structure taken along lines J-J', K-K', and L-L' in FIG. 13, and FIG. 15 illustrates an example of the cross-sectional structure taken along line M-M' in FIG. 13, including a region of a color filter CF.

Referring to FIGS. 13 and 14, the second passivation layer 207 is disposed on the planarization layer 206, and the common electrode COM is disposed on the second passivation layer 207. The touch load reduction layer 300 may be disposed on the common electrode COM, and a touch line insulating layer 209 may be disposed on the touch load reduction layer 300.

A touch line TL may be disposed on the touch line insulating layer 209.

Since the touch line TL and the common electrode COM may be insulated with the touch line insulating layer 209, the degree of freedom of design of the touch line TL or the touch load reduction layer 300 can be improved.

In particular, the touch line TL and the common electrode COM can be prevented from being shorted even in the case in which the touch line TL is disposed to adjoin a side surface of the touch load reduction layer 300 in terms of processing.

In addition, the touch line insulating layer 209 may provide functions that the touch line TL is disposed easily. For example, in case the touch load reduction layer 300 is disposed using an organic film, there may be an adhesion problem between the touch load reduction layer 300 and the touch line 300 being a metal. In this case, the touch line insulating layer 209 being an inorganic film is disposed between the touch load reduction layer 300 being an organic film and the touch line TL being a metal, thereby the touch line TL could be disposed easily when the touch load reduction layer 300 is disposed using an organic film.

And, in some cases, the touch load reduction layer 300 may be disposed as disconnected structures in an area where the common electrode COM and the touch line TL are connected. For example, it may not be easy to form a contact hole in the touch load reduction layer 300 according to a material composing the touch load reduction layer 300. In this case, the common electrode COM and the touch line TL may be connected since the touch load reduction layer 300 includes disconnected structures.

And the touch line TL may be separated from the common electrode COM by the touch line insulating layer 209 and the touch load reduction layer 300 in those areas where it is not connected to the common electrode COM. That is, in an area where the touch line TL and the common electrode COM are connected, the touch line TL may be connected electrically with the common electrode COM through a contact hole passing through the touch line insulating layer 209. And a material composing the touch line insulating layer 209 (e.g. inorganic material) may be different from a material composing the touch load reduction layer 300.

Here, disconnected portions of the touch load reduction layer 300 may exist repeatedly in every certain position. Or, in some cases, the disconnected portions of the touch load reduction layer 300 may exist only in an area where the touch line TL and the common electrode COM are connected.

Even in the case in which the touch line insulating layer 209 is disposed, the common electrode compensation pattern 400, made of the same material as the touch line TL, may be provided in a region on the data line DL, in which the touch line TL is not disposed.

In a region on the common electrode COM, in which the touch load reduction layer 300 is not disposed, the touch line insulating layer 209 may be disposed in contact with the common electrode COM. In this case, the common electrode compensation pattern 400 and the common electrode COM may be connected via a fourth contact hole CH4 provided in the touch line insulating layer 209.

As described above, the touch display device 100 according to embodiments of the present disclosure provides a shielding pattern function by disposing the common electrode COM between the touch line TL and the data line DL. This consequently provides a structure able to improve touch sensing performance without an increase in the number of masks.

In addition, the touch load reduction layer 300 is disposed between the touch line TL and the common electrode COM to reduce the load of the touch line TL.

In addition, a variety of other structures may be provided. For example, the common electrode compensation pattern 400 may be disposed in a region in which the touch line TL is not disposed, or the touch line insulating layer 209 may be disposed below the touch line TL. Due to such structures in which the shielding pattern and the touch load reduction layer 300 are disposed, functional advantages or the ease of processing can be provided.

In addition, due to the above-described structure of the touch load reduction layer 300, the color filter CF and black matrices BM may be disposed to match the structure of the touch load reduction layer 300.

Referring to FIG. 15, an example structure, in which the touch line TL, the touch load reduction layer 300, the common electrode compensation pattern 400, and the like are disposed on the data line DL, and an example structure, in which the color filter CF and the black matrices BM are disposed in a responsive manner, are illustrated.

Specifically, in the structure in which a first data line DL1, a second data line DL2, and a third data line DL3 are disposed, the common electrode COM, the touch load reduction layer 300, and the touch line TL may be disposed on the first data line DL1.

That is, the common electrode COM may be disposed between the touch line TL and the data line DL, and the touch load reduction layer 300 may be disposed in a region in which the touch line TL and the common electrode COM overlap. In addition, the touch load reduction layer 300 may not be disposed in a region in which the common electrode COM and the pixel electrodes PXL overlap.

In addition, the common electrode COM and the common electrode compensation pattern 400 may be disposed on the second data line DL2. That is, the common electrode compensation pattern 400 provided in the region in which the touch line TL is not disposed can improve (in other words: reduce) the resistance of the common electrode COM.

The common electrode COM may not be disposed on the third data line DL3. Since the common electrode COM is used as the touch electrodes 1B, the common electrode COM may be split.

In the structure in which the touch line TL and the touch load reduction layer 300 are disposed, the touch load reduction layer 300 may cause the distance between the subpixels SP to be non-uniform.

In this case, the black matrices BM disposed between the subpixels SP may have different widths, depending on whether or not the touch load reduction layer 300 is disposed.

For example, the first black matrix BM1 disposed on the touch load reduction layer 300 may have a third width W3, while the second black matrix BM2 and the third black matrix BM3 disposed in the regions, in which the touch load reduction layer 300 is not disposed, may have a fourth width W4 narrower than the third width W3.

Since the black matrices BM have different widths, depending on whether or not touch load reduction layer 300 is disposed, the touch load reduction layer 300 can be prevented from being visually recognized And, it could be prevented to represent black visually according to misalignment or shift of a liquid crystal array by stepped portions of the touch load reduction layer 300, by increasing a width of the black matrix BM disposed on an area where the touch load reduction layer 300 is disposed. Specifically, in case an inclination of the stepped portions of the touch load reduction layer 300 is severe, the liquid crystal array may be twisted or distortion may occur in the liquid crystal array in such a region. Due to such an abnormal liquid crystal array, images of those regions could be displayed abnormally (e.g. darkness or light leakage). So, such abnormal displays could be prevented by increasing the width of the black matrix BM in an area where the touch load reduction layer 300 is disposed.

In addition, as illustrated in FIG. 15, open portions, in which the first color filter CF1, the second color filter CF2, and the third color filter CF3 are located, have fifth widths W5, which are uniform. Even in the case in which the touch load reduction layer 300 is disposed, an image can be displayed without an adverse effect.

And, in some cases, the touch load reduction layer 300 may be disposed in every area where the black matrix BM is disposed. For example, in case a display required more touch lines TL, the touch load reduction layer 300 may be disposed in every area where the black matrix BM is disposed. That is, in case of a large screen display, since the large screen display includes more touch electrodes compared to a small screen display, more touch lines TL are necessary in the large screen display. So, the number of touch lines TL may be increased by disposing a touch line TL in every area between subpixels SP or disposing a touch line TL on a line where the data line DL is disposed. So, the number of the touch load reduction layers 300 could be increased since the touch load reduction layer 300 is disposed on areas where a touch line TL is disposed. In some cases, the touch load reduction layer 300 may be disposed in every area where the black matrix BM is disposed. In this case, a width of the black matrix BM may be constant. And a width of an opening portion of the subpixel SP may be constant also. So, for preventing abnormal displays, the touch load reduction layer 300 may be disposed.

According to the foregoing embodiments of the present disclosure, the shielding pattern to which a signal corresponding to a touch driving signal is applied is disposed between the line to which a display driving signal is applied and the touch line TL. This can prevent the touch sensing signal from inducing display noise, thereby improving the performance of touch sensing carried out simultaneously with display driving.

In addition, since the shielding pattern is disposed using the common electrode COM, the shielding pattern can be disposed without increasing the number of masks.

In addition, since the touch load reduction layer 300 is disposed in the region in which the touch line TL and the common electrode COM overlap, except for the region in which the common electrode COM and the pixel electrodes PXL overlap, the load of the touch line TL can be reduced, and the performance of display driving can be protected from an adverse effect.

As set forth above, an increase in the number of masks can be minimized by disposing the touch electrodes TE and the common electrode COM having a shielding pattern function and disposing the touch load reduction layer 300 and the touch line TL on the common electrode COM. Accordingly, the touch display panel 110 and the touch display device 100 able to improve touch sensing performance are provided.

The foregoing descriptions and the accompanying drawings have been presented in order to explain certain principles of the present disclosure. A person having ordinary skill in the art to which the present disclosure relates could make various modifications and variations without departing from the principle of the present disclosure. The foregoing embodiments disclosed herein shall be interpreted as being illustrative, while not being limitative, of the principle and scope of the present disclosure. It should be understood that the scope of the present disclosure shall be defined by the appended claims.

What is claimed is:

1. A touch display device comprising:
a plurality of data lines;
a plurality of touch lines including a touch line that overlaps a data line from the plurality of data lines;
a plurality of common electrodes located between the plurality of data lines and the plurality of touch lines, the plurality of common electrodes including a common electrode between the touch line and the data line such that the common electrode overlaps both the touch line and the data line;
a plurality of pixel electrodes including a pixel electrode that forms an electric field with the common electrode; and
a touch load reducing layer between the touch line and the common electrode;
wherein the touch line overlaps the touch load reducing layer and a width of the touch load reducing layer is wider than a widest width of the touch line, and
wherein the pixel electrode and the touch line are disposed on a same surface of the common electrode, and a distance between the touch line and the common electrode is larger than a distance between the pixel electrode and the common electrode.

2. The touch display device according to claim 1, wherein the touch load reducing layer is not overlapping the pixel electrode that forms the electric field with the common electrode.

3. The touch display device according to claim 1, wherein the touch load reducing layer is between the touch line and a portion of the common electrode that overlaps the touch line and the data line.

4. The touch display device according to claim 1, wherein at least one of the plurality of touch lines is electrically connected to a corresponding one of the plurality of common electrodes via a first contact hole.

5. The touch display device according to claim 4, wherein the touch load reducing layer comprises a first portion and a second portion, the first portion having a first width and the second portion having a second width that is wider than the first width, and
wherein the first contact hole is in the second portion of the touch load reducing layer having the second width.

6. The touch display device of claim 5, wherein the first portion of the touch load reducing layer comprising the first width is between the touch line and the common electrode.

7. The touch display device according to claim 1, wherein a touch driving signal is applied to the common electrode, and a data voltage is applied to the data line, the data voltage modulated based on the touch driving signal.

8. The touch display device according to claim 1, further comprising:
a common electrode compensation pattern located on and in contact with one of the plurality of common electrodes that overlaps one of the plurality of data lines, the one of the plurality of data lines non-overlapping with one of the plurality of touch lines.

9. The touch display device according to claim 8, wherein the common electrode compensation pattern is made of a same material as the plurality of touch lines.

10. The touch display device according to claim 1, further comprising:
a pixel insulating layer between the plurality of common electrodes and the plurality of pixel electrodes, wherein at least a portion of the pixel insulating layer is on the plurality of touch lines.

11. The touch display device according to claim 1, further comprising:
a touch line insulating layer between the touch line and the touch load reducing layer,
wherein a portion of the touch line insulating layer surrounds the touch load reducing layer and the common electrode that is below the touch load reducing layer.

12. The touch display device according to claim 1, further comprising:
a planarization layer between the plurality of data lines and the plurality of common electrodes,
wherein each of the plurality of pixel electrodes is electrically connected to a corresponding one of the plurality of data lines via a second contact hole in the planarization layer.

13. The touch display device according to claim 12, further comprising:
a connection pattern having a portion in the second contact hole, the connection pattern electrically connecting the data line to the pixel electrode;
wherein the connection pattern is made of a same material as the plurality of common electrodes and is electrically insulated from the plurality of common electrodes.

14. The touch display device according to claim 1, further comprising:
a color filter overlapping the plurality of pixel electrodes; and
black matrices;
wherein a width of a first black matrix from the black matrices that overlaps one of the plurality of touch lines is wider than a width of a second black matrix of the black matrices that is non-overlapping with one of the plurality of touch lines.

15. The touch display device of claim 1, wherein the touch line is in direct contact with the touch load reducing layer, wherein the width of the touch load reducing layer is a widest width of the touch load reducing layer.

16. The touch display device of claim 15, wherein a portion of the touch line with the widest width is in direct contact with the touch load reducing layer.

17. The touch display device of claim 1, further comprising:
a touch driver circuit that supplies a touch driving signal to the plurality of touch lines to sense touch of the touch display device.

18. The touch display device of claim 1, wherein the touch load reducing layer is wider than the touch line and overlaps an entire length of the touch line.

19. The touch display device of claim 1, wherein the touch load reducing layer is made of an inorganic film and has at height in a range of 500 angstroms to 10,000 angstroms or the touch load reducing layer is made of an inorganic film and an organic film and has a height in a range of 10,000 angstroms to 40,000 angstroms.

20. A touch display panel comprising:
a plurality of data lines;
a plurality of touch lines including a touch line that overlaps a data line from the plurality of data lines;
a plurality of common electrodes located between the plurality of data lines and the plurality of touch lines, the plurality of common electrodes including a common electrode between the touch line and the data line such that a portion of the common electrode overlaps both the touch line and the data line, the portion of the common electrode shielding the touch line from the data line;

a plurality of pixel electrodes including a pixel electrode that forms an electric field with the common electrode; and a touch load reducing layer between the touch line and the common electrode, wherein the pixel electrode and the touch line are disposed on a same surface of the common electrode, and a distance between the touch line and the common electrode is larger than a distance between the pixel electrode and the common electrode.

21. The touch display panel according to claim 20, wherein the touch line overlaps the touch load reducing layer and a width of the touch load reducing layer is wider than a widest width of the touch line.

* * * * *